(No Model.) 2 Sheets—Sheet 1.

H. E. EBERHARDT.
FRICTION COUPLING.

No. 311,179. Patented Jan. 27, 1885.

Attest.
L. Lee.
Henry J. Theberath.

Inventor:
Henry E. Eberhardt,
per Thos. S. Crane Atty (No Model.) 2 Sheets—Sheet 2.

H. E. EBERHARDT.
FRICTION COUPLING.

No. 311,179. Patented Jan. 27, 1885.

Attest.
L. Lee
Henry J. Theberath

Inventor:
Henry E. Eberhardt
per Thos. S. Crane, Atty

UNITED STATES PATENT OFFICE.

HENRY E. EBERHARDT, OF NEWARK, NEW JERSEY.

FRICTION-COUPLING.

SPECIFICATION forming part of Letters Patent No. 311,179, dated January 27, 1885.

Application filed November 3, 1884. (No model.)

*To all whom it may concern:*

Be it known that I, HENRY E. EBERHARDT, a citizen of the United States, residing in Newark, Essex county, New Jersey, have invented certain new and useful Improvements in Friction-Couplings, fully described and represented in the following specification and the accompanying drawings, forming a part of the same.

This invention consists in a mechanism for pressing exterior and interior cones together by means of a threaded bushing fitted to the hubs of the two cones, respectively; in means for rotating such threaded or screw bushing by a shifting-crank or roller; in means for compensating the wear upon the conical surfaces, and in means for holding the screw-bushing in a fixed position while adjusting the compensating device.

Figure 2:
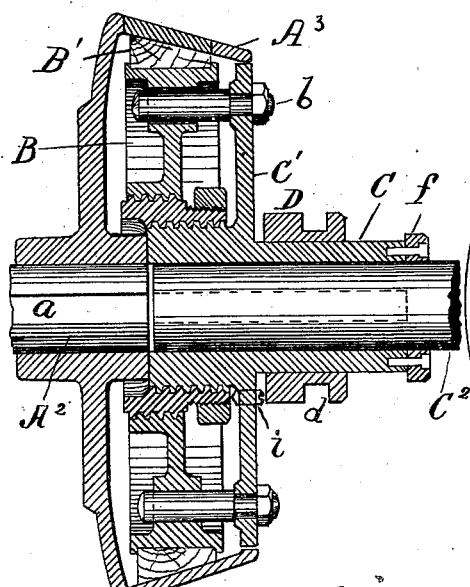
Figure 1:
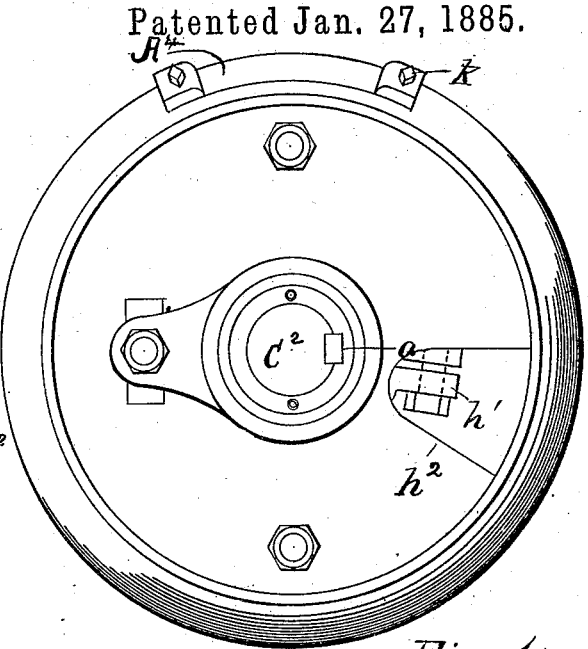
Figure 3:
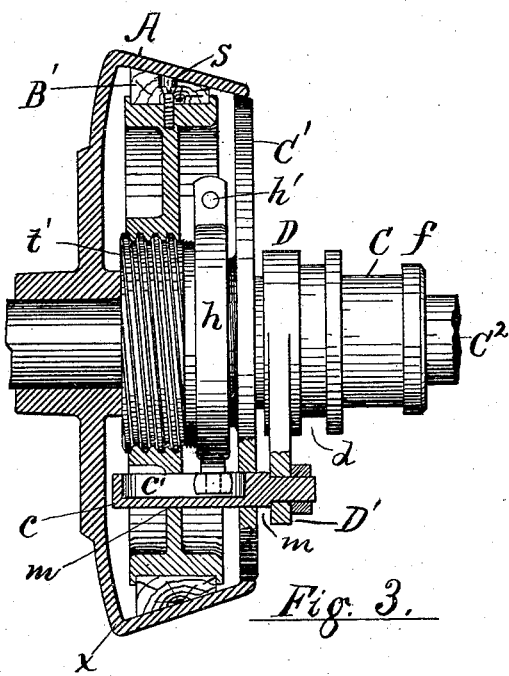
Figure 4:
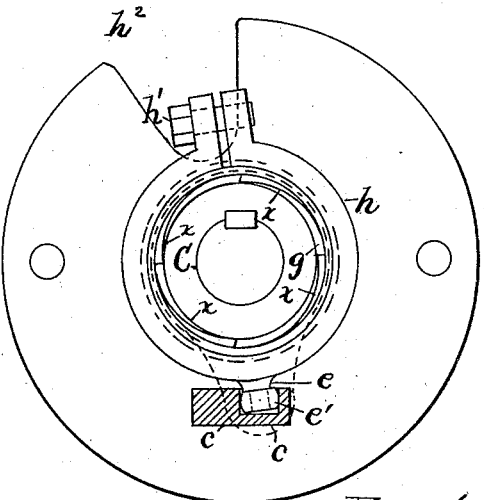
Figure 5:
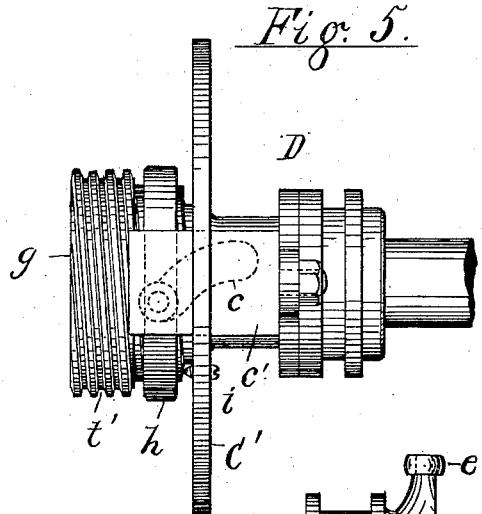
Figure 6:
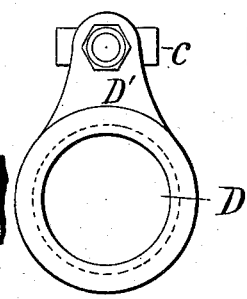
Figure 7:
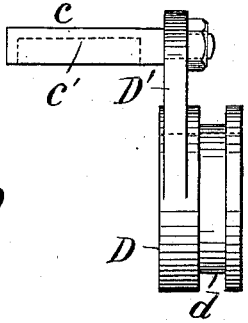
Figure 10:
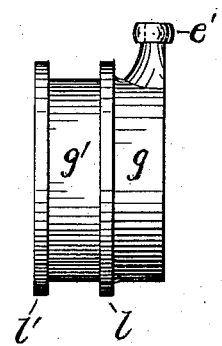
Figure 11:
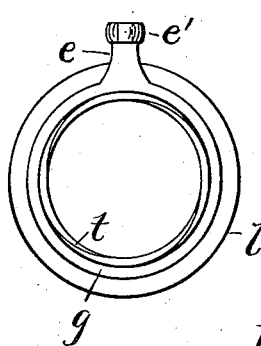
Figure 9:
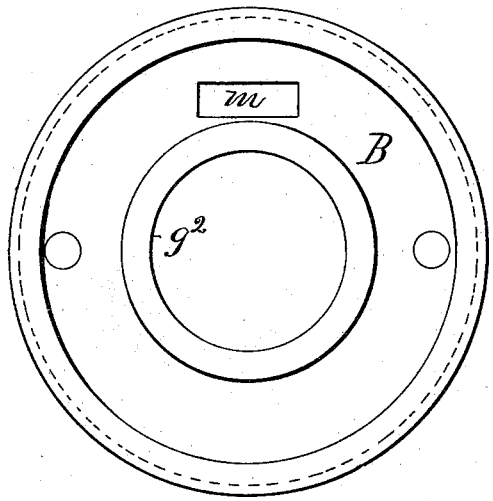
Figure 8:
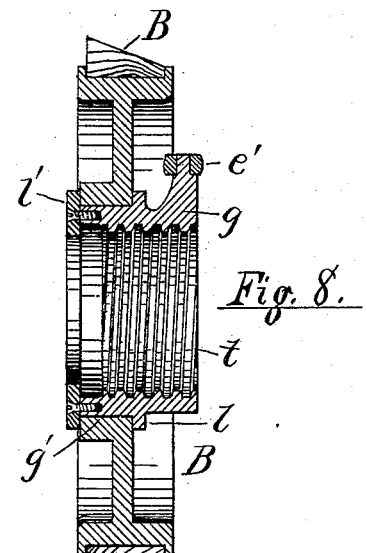

The invention will be understood by reference to the annexed drawings, in which Figure 1 is an end elevation of a shaft with the clutch attached by a key, $a'$, and the collar $f$ being omitted. Fig. 2 is a section on line $x$ $x$ in Fig. 1, the coupled shafts and the driving-studs not being in section. Fig. 3 is a partial section on line $y$ $y$ in Fig. 1, the parts not sectioned being cylindrically shaded. Fig. 4 is an interior view of the driving-plate, with the screw-bushing and shifting-roller attached, and the cam-plate being shown in transverse section at the roller. Fig. 5 is an edge view of the same parts viewed at the side where the cam-plate passes through the driving-plate. Fig. 6 is a front view, and Fig. 7 an edge view, of the sliding sleeve and cam-plate detached. Fig. 8 is a transverse sectional view of the threaded bushing, with the cone B B' attached to it by a swivel instead of a thread. Fig. 9 is a side view of the cone detached from the swivel, and Figs. 10 and 11 are respectively edge and side views of the threaded bushing and swivel detached from the cone.

A is a hollow cone, having its larger end attached to a disk, A', and secured rigidly to a shaft, $A^2$, as by key in a seat, $a$. B B' is a cone fitted to the interior of the cone A, the cone consisting preferably of blocks B', secured by screws $s$ in the periphery in a circular casting, B. C is a hub fixed rigidly to a shaft, $C^2$, and formed with a flange, C', which serves as a driving-plate to rotate the cone B B' by means of studs $b$ $b$. Either of the shafts $A^2$ or $C^2$ may be the driver, and motion is transmitted to the other shaft by forcing the cone B B' into frictional contact with the hollow cone A; but the cone B B' is called the "driving-cone" herein. To effect this the cone and hub C are connected by a screw-bushing, $g$, adapted to turn upon a thread on either the hub or cone, and to thereby produce the desired longitudinal movement of the latter. To produce such rotation of the bushing the same is provided with a roller, $e'$, carried by a radial crank, $e$, which is shifted about the shaft by a cam-groove, $c'$, in a bar, $c$. This bar is moved longitudinally by an arm, D', attached to a sliding sleeve, D, fitted movably upon that part of the hub C outside of the plate C', and the bar moving through mortises $m$ in the plate C' and cone B B'. A groove, $d$, is shown in the sleeve, to shift it by a lever in the usual manner, and its extreme inner and outer positions are shown, respectively, in Figs. 2 and 5, the latter figure, as well as Fig. 4, showing the operation of the cam-slot to shift the crank-arm $e$ and to thus rotate the bushing $g$. In Figs. 1 to 5 the bushing is shown provided with an internal thread, $t$, fitted to that part of the hub C inside the plate C', and with an external thread, $t'$, fitted to the eye of the cone B B'. These threads are made right and left hand, and of quadruple pitch, as shown at $t$ in Fig. 4, so that a slight rotation of the crank $e$ may produce a considerable longitudinal movement of the cone B B', sufficient to clear it fully from contact with the hollow cone A.

To compensate for wear upon the frictional surfaces means are provided for attaching the shifting-crank $e$ or roller $e'$ movably to the bushing $g$, so that when the normal movement of the cam does not press the cones together tightly enough the crank may be moved in relation to the screw-thread upon the bushing. This I effect by applying a clamp-ring, $h$, to the outside of the bushing, with a clamping-bolt, $h'$, to hold it firmly to the same. As the crank can only be actuated by the cam-slot, and can only be turned upon the bushing by holding the latter stationary, I insert a set-screw, $i$, through the plate C', so as to jam against the end of the bushing when the cone B B' is in contact with the hollow cone A, and can thus reset the crank in the desired manner.

To operate the bolt $h'$ a notch, $h^2$, is provided in the plate C' for the insertion of a hand-wrench, and when the set-screw $i$ is fixed with the cones in contact, as just described, and the bolt $h'$ slackened, the operator shifts the clamp-ring to a new position by moving the sleeve and cam-block as if to separate the cones, without, however, producing that effect, but only turning the crank $e$ and roller $e'$ upon the bushing to a more effective position, where they are then clamped by tightening the bolt $h'$, and the screw $i$ being then slackened the cam-groove serves to press the cones more strongly together when actuated than before the resetting of the crank.

The bushing may be operated without the adjustable crank for a long while, and the wear compensated by renewing the wooden blocks B', a hole, $A^3$, being formed in the shell of cone A and covered by a smoothly-fitted piece, $A^4$, (held by bolts $k$, as in Fig. 1,) so that the blocks may be replaced at pleasure. The bushing may also be operated with only a single screw-thread by coupling it to the hub C or cone B B' by a swivel, such construction being shown in Figs. 8 to 11, inclusive. In these figures, B is the cast-iron cone-body, formed with a smooth hole, $g^2$, internally, and $g$ is the bushing, threaded internally to fit the hub C, and provided externally with a smooth neck, $g'$, to fit the hole $g^2$. A fixed collar, $l$, is formed on the bushing at one side of the neck, and a movable collar, $l'$, held to the bushing by screws $m$ at the other side, thus forming a swivel on which the cone-body turns, and by which it is drawn toward the hollow cone when the bushing is rotated, the studs $d$ permitting only longitudinal movement of the cone B B'. The cam-slot is shown in Fig. 5 with a short section of the curve at each end, parallel to the path of the block $c'$, and the roller $e'$ (which is employed to diminish the friction merely) is thus locked in its extreme positions at each end of the slot, or the tendency of the roller to shift the cam-block is thus corrected.

It will be noticed that the means used for rotating the threaded bush may be operated just as well when the clutch is revolving as when it is standing still, the grooved sleeve D operating in that respect as in other clutches.

Having thus described a modification of my invention, I do not limit myself to the precise construction shown, provided the threaded bushing is used to press the cones together, as other features of the mechanism may be modified in form without detracting from the utility of the invention.

I therefore claim—

1. The combination, with the cone A and shaft $A^2$, attached together as described, of the hub C, attached to the shaft $C^2$, as described, the driving-cone fitted within the cone A, the threaded bushing connected to the hub and driving-cone, as described, and means, as cam-block $c$, actuated independently of the clutch, for rotating the threaded bushing and pressing the cones together.

2. The combination, with the cones A and B B', the hub C, the plate D, and the shafts $A^2$ and $C^2$, attached to the cone A and hub C, as described, of the studs $d$, attached to the plate D, and inserted loosely in the driving cone, the threaded bush connecting the hub and driving-cone together, and means, as cam-block $c$, actuated independently of the clutch, for rotating the threaded bushing and pressing the cones together.

3. The combination, with the cone A and hub C, attached to the separate shafts, of the driving-cone rotated by studs connected with the hub C, the bushing provided with crank $e$, and threaded internally and externally, and fitted to the hub and driving-cone, as described, the sliding sleeve D upon the hub C, and the cam-block operating upon the crank $e$, substantially as and for the purpose set forth.

4. The combination, in a clutch, of two opposed cones, a threaded bushing, for pressing the cones together, a mechanism, as cam $c$, for rotating the bushing a fixed amount, and an adjustable crank fitted to the bushing, and provided with means for securing it upon the bushing, as and for the purpose set forth.

5. The combination, in a clutch, of two opposed cones, a threaded bushing for pressing the cones together, a mechanism, as cam $c$, for rotating the bushing a fixed amount, the clamp-ring $h$ and bolts $h'$, securing the roller $e'$ adjustably to the bushing, and the set-screw $i$, for holding the bushing in a fixed position when adjusting the ring upon the same, as and for the purpose set forth.

In testimony whereof I have hereunto set my hand in the presence of two subscribing witnesses.

HENRY E. EBERHARDT.

Witnesses:
THOS. S. CRANE,
C. C. HERRICK.